INVENTORS
HAIG D. TARPINIAN
THADDEUS WOLCZYNSKI

BY Charles A. Blank
ATTORNEY

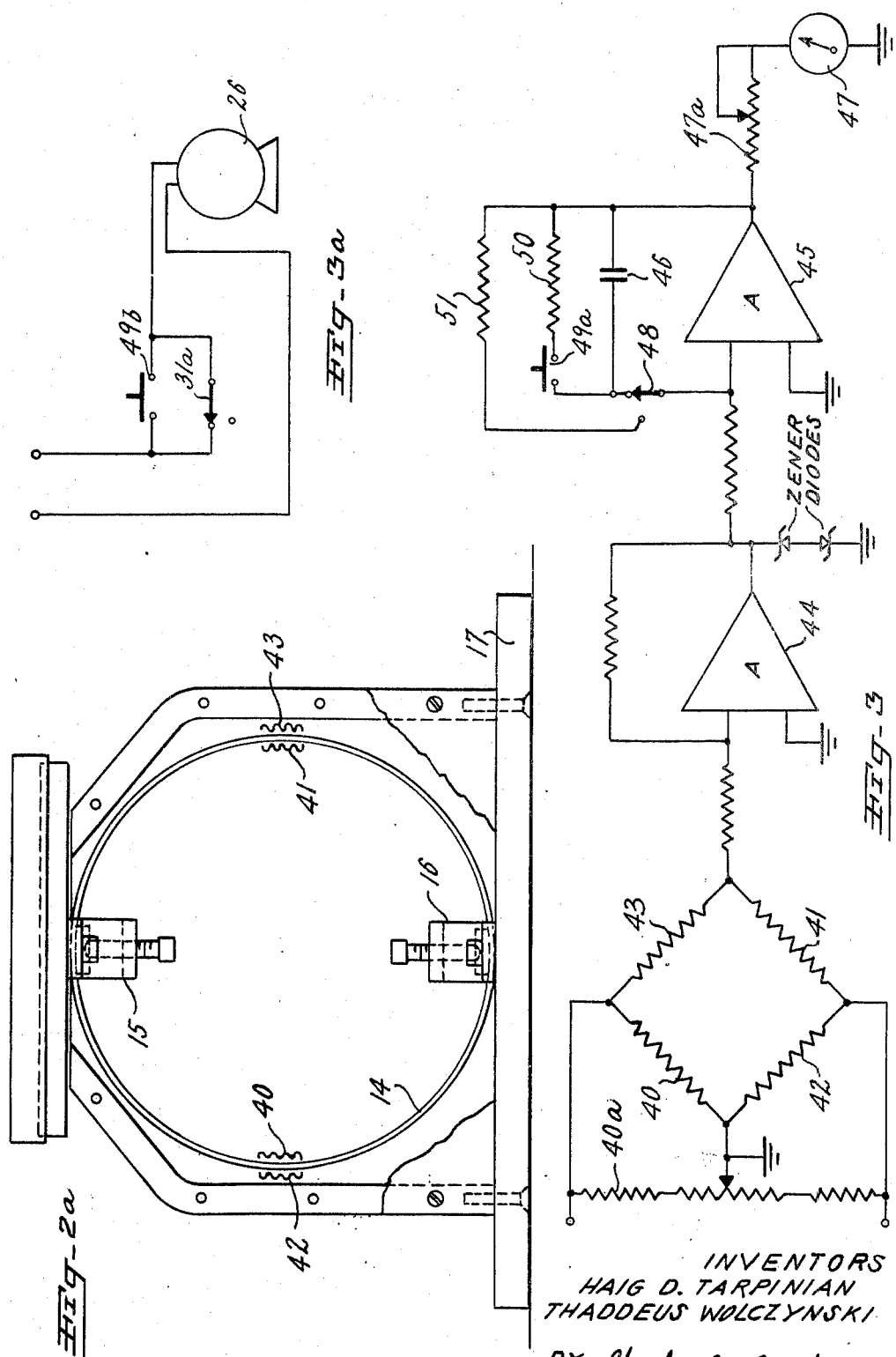

United States Patent Office 3,485,089
Patented Dec. 23, 1969

3,485,089
HARDNESS INDICATING APPARATUS
Haig D. Tarpinian, Grosse Pointe, and Thaddeus Wolczynski, Detroit, Mich., assignors to Uniroyal, Inc., a corporation of New Jersey
Filed Apr. 4, 1966, Ser. No. 539,700
Int. Cl. G01n 3/40
U.S. Cl. 73—78     6 Claims

ABSTRACT OF THE DISCLOSURE

Apparatus for indicating the hardness of granular material comprises means for crushing a sample of a plurality of granules of the material during a single predetermined displacement of the crushing means, the sample resisting crushing with a force determined by the hardness of the material. The apparatus also includes means for developing a first control effect representative of the instantaneous value of the force during the displacement of the crushing means. The apparatus also includes means for integrating the first control effect with respect to a variable related to the displacement of the crushing means to develop a second control effect representative of the integrated value of the first control effect over the displacement and thus representative of the hardness of the material.

---

This invention relates to apparatus for indicating the hardness of granular material. More particularly, the apparatus is useful for indicating the hardness of pellets or flakes of chemical additives utilized in rubber processing.

In automatic systems for delivering carbon black and rubber chemicals to mixers, pellets of carbon black which are too soft break down and clog the system. Conversely, if the pellets are too hard, they will not properly disperse into the rubber. Apparatus previously proposed for measuring the hardness of carbon black particles, has, in general, been more complex in structure and operation than is desirable.

Hardness is proportional to the force required to collapse a pellet. In a random sample of carbon black pellets, the variation in hardness among individual pellets is often larger than the mean value of hardness for all of the pellets. To obtain a realistic figure of hardness for a volume of pellets, it is necessary to test a large sample. Prior test apparatus has generally required testing only one or a few pellets at a time. For this reason, the number of pellets actually tested is usually insufficient. Moreover, the operator is ordinarily required to select the individual pellets to be tested. Since the operator selects only pellets which are large enough to handle, the significance of the data is diminished.

It is an object of the present invention, therefore, to provide a new and improved apparatus for indicating the hardness of granular material.

It is another object of the invention to provide a new and improved apparatus for indicating the hardness of granular material in which pellets of different sizes can be measured at the same time in a random sample of the material.

It is another object of the invention to provide a new and improved apparatus for indicating the hardness of granular material which is of simple construction, easy to operate and readily calibrated.

In accordance with the invention, apparatus for indicating the hardness of granular material comprises means for crushing a sample of the material during a predetermined displacement of the crushing means. The sample resists crushing with a force determined by the hardness of the material. The apparatus also includes means for developing a first control effect representative of the instantaneous value of the force during the displacement of the crushing means. The apparatus also includes means for integrating the first control effect with respect to a variable related to the displacement of the crushing means to develop a second control effect representative of the integrated value of the first control effect over the displacement and thus representative of the hardness of the material.

For a better understanding of the present invention, together with other and further objects thereof, reference is made to the following description, taken in connection with the accompanying drawings, and its scope will be pointed out in the appended claims.

Referring now to the drawings:

FIG. 2a is a side elevational view, partly schematic, of the support for the lower platen of the apparatus;

FIG. 3 is a schematic circuit diagram of an electrical portion of the FIG. 1 apparatus; and FIG. 3a is a schematic circuit diagram of another electrical portion of the FIG. 1 apparatus.

Figure 1:
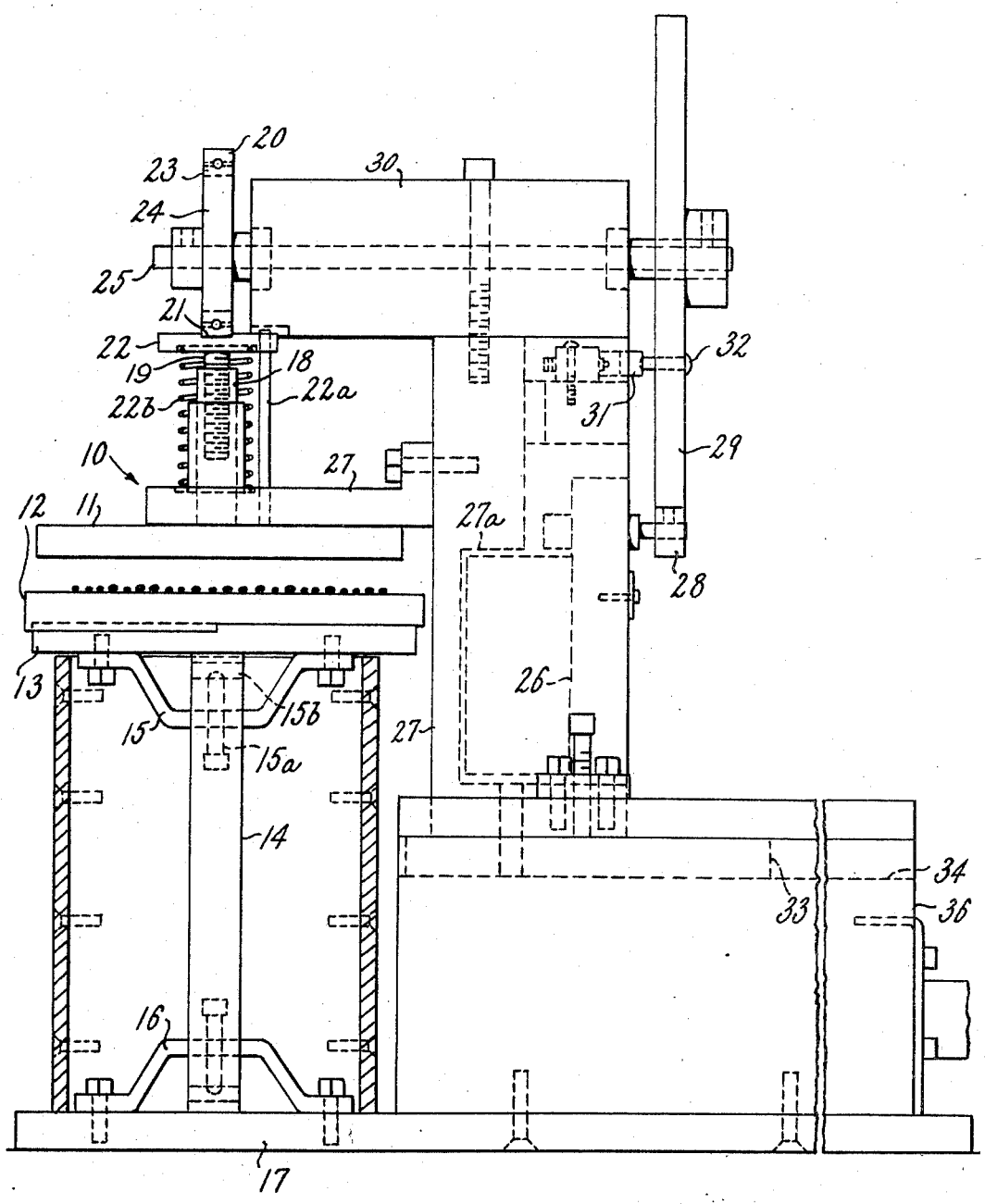
FIG. 1 is a front elevational view of apparatus constructed in accordance with the invention.
Figure 2:
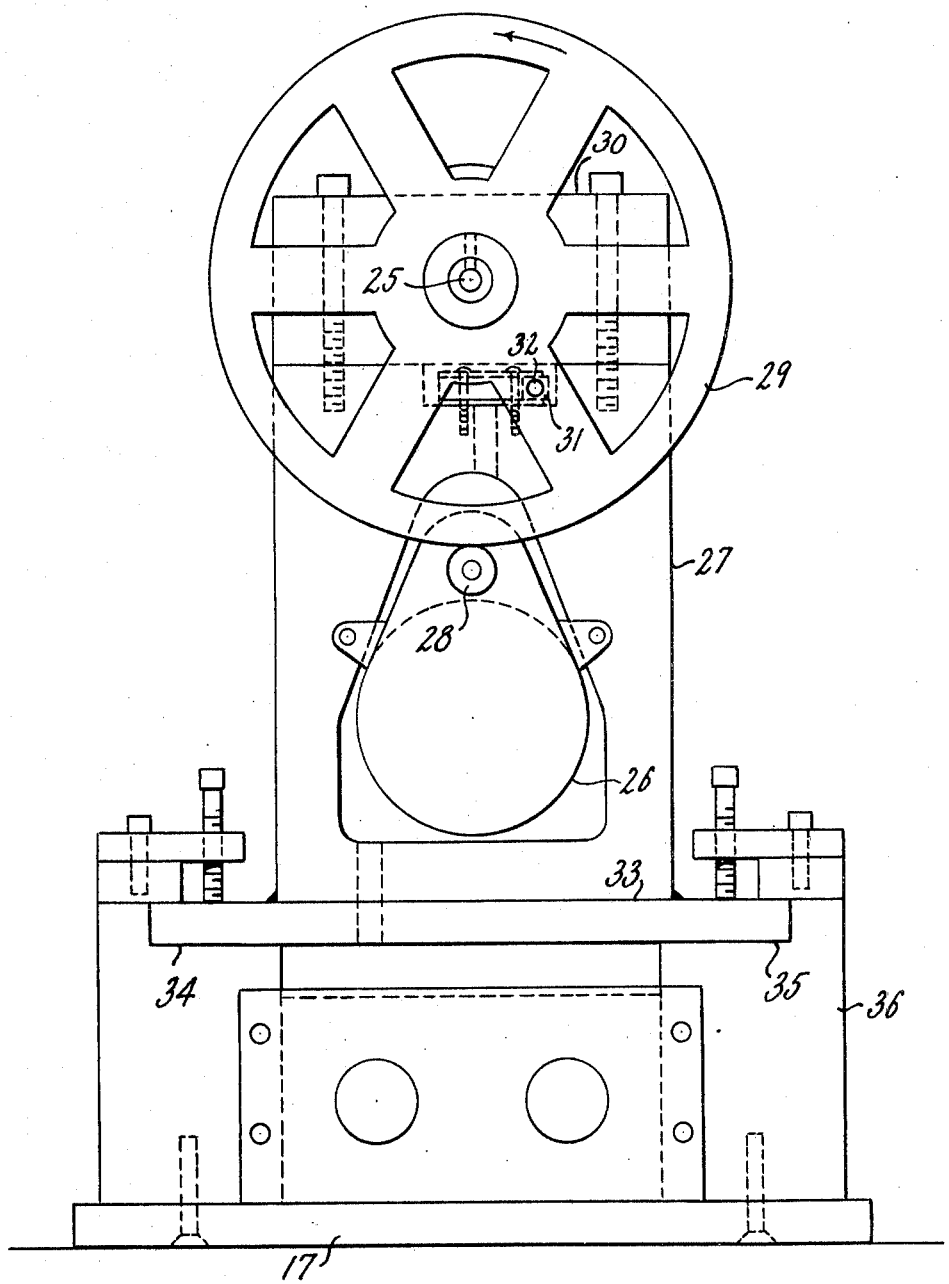
FIG. 2 is a side elevational view of the FIG. 1 apparatus.

Referring now more particularly to FIGS. 1, 2, and 2a of the drawings, apparatus constructed in accordance with the invention for indicating the hardness of granular material comprises means for crushing a sample of the material during a predetermined displacement of the crushing means, the sample resisting crushing with a force determined by the hardness of the material. More particularly, the crushing means comprises a press 10 having a movable platen 11 and a stationary platen 12 mounted on a support 13 which is positioned on a load cell 14 subject to distortion determined by the crushing force, as more fully described hereinafter. The platen 12 may be removed from the support 13 during a loading operation and may be fitted onto the support 13 with suitable surfaces abutting.

The support 13 is positioned on the load cell 14 and is bolted to a brace 15 which has a bolt 15a threaded therein and clamping a pressure button 15b on the load cell 14. The load cell 14 comprises a steel ring on which four suitable wire strain gauges, represented schematically in FIG. 2a, are mounted with 180° horizontal spacing on the inner and outer surfaces of the ring for developing a first control effect representative of the instantaneous value of the crushing force during the displacement of the crushing means. The ring 14 is also clamped by a brace 16 bolted to a base member 17.

The upper platen 11 has a stem 18 threaded on a stud 19. An eccentric drive is utilized comprising an outer ball race 20 force fitted in a groove 21 of plate 22 supporting stud 19 and movable along uide 22a. The inner race 23 is fixedly mounted on an accentric cam 24 on shaft 25. A spring 22b is seated against the plate 22 and a portion of the supporting frame 27 for raising the upper platen 11.

A suitable clock motor 26 mounted in a portion of supporting frame 27a drives a capstan 28 through a suitable gear train (not shown). The capstan 28, in turn, drives a fly wheel 29 to rotate the shaft 25 in the bearing block 30 and thereby to raise and lower the upper platen 11.

A microswitch 31 is actuated by a suitable screw 32 on the drive wheel 29 when the platen 11 is in its uppermost position.

The support 27 has a suitable base plate 33 slidable in tracks 34, 35 of base housing 36 for moving the upper platen laterally away from the lower platen.

The apparatus also includes means for integrating the first control effect with respect to a variable related to the displacement of the crushing means, for example, with respect to time, to develop a second control effect representative of the integrated value of the first control effect over the displacement and thus representative of the hardness of the material.

The four strain gauges of the load cell are coupled in a bridge circuit as represented in FIG. 3. As represented in FIG. 2a, the two gauges 40, 41 are mounted on the inside of horizontal centerline portions of the ring 14 of FIG. 1 and the two gauges 42, 43 are mounted on the outside of the horizontal centerline portions of the ring 14. The output circuit of the bridge is coupled through a suitable feedback amplifier 44 to an integrator 45 of the feedback amplifier type having a condenser 46 in the feedback circuit. The output circuit of the integrator is coupled to a suitable indicating meter 47. Suitable reset and calibration circuits are also represented.

The integrator 45 includes a suitable discharge path for the condenser 46 through the reset switch contacts 49a and resistor 50. A switch 48 is provided for coupling resistor 51 into the feedback path of the amplifier for calibration purposes.

The energization circuit for motor 26 is represented in FIG. 3a. The motor may be started through contacts 49b of the reset switch. Contacts 31a of the microswitch 31 are closed except when the screw 32 of FIG. 1 is in contact wtih the microswitch.

Considering now the operation of the FIG. 1 apparatus, the lower platen 12 may be removed from the support 13 to facilitate loading a predetermined volume of pellets on the lower platen 12. The pellets may be taken at random and spread in a single layer on the lower platen 12. The motor 26 may then be energized by closing the reset switch contacts 49b. The motor rotates the drive wheel 29 through one revolution until the microswitch 31 is again actuated by the screw 32. During the revolution of the drive wheel 29, the shaft 25 rotates through one revolution and the eccentric cam 24 rotates through one revolution, causing the stud 19 and upper platen 11 to be lowered and raised again.

During the crushing of the pellets the force on the lower platen 12 is the sum of the forces on all of the pellets. As the upper platen 11 moves downwardly, it intercepts first the largest pellets, then the smaller pellets. The largest pellets often collapse before the smaller pellets are intercepted. The integral of the instantaneous force on the lower platen 12 with respect to the displacement of the upper platen 11 between the limits of the displacement is the energy required to crush the pellets. Thus, over a fixed displacement the average crushing force is proportional to the total energy input. Hardness is defined as being proportional to the force required to collapse a pellet, and, therefore, by measuring the total energy input an indication proportional to bulk hardness of a predetermined volume of pellets may be derived.

Although integration with respect to displacement is possible by the use of suitable analog circuits, crushing energy is also represented by the integral of the instantaneous force with respect to time. However, time-displacement function is non-linear because the velocity of the upper platen 11 is not constant during the crushing, and thus the value of the integral of the instantaneous force with respect to time does not vary linearly with crushing energy.

While the pellets are being crushed, the ring 14 of the load cell is deformed in proportion to the crushing force and the bridge 40, 41, 42, 43 of FIG. 3 is unbalanced to develop an output signal having an instantaneous value representative of the crushing force. The output signal of the bridge is amplified by amplifier 44 and is integrated by integrator 45 which develops an integrated output signal representing crushing energy and thus the hardness of the material.

A calibrated scoop is utilized to provide a fixed volume of pellets during loading. The calibrate-integrate switch 48 allows the operator to check the overall gain in the system by putting a known load on the load cell and reading the meter. Any small variation in gain may be compensated by adjustment of the adjustable resistor 47a. The displacement of the upper platen may be adjusted by rotating the stem 18 on the stud 19. The zero adjustment of the bridge 40, 41, 42, 43 is controlled by adjustable voltage divider 40a.

From the foregoing description it will be apparent that apparatus constructed in accordance with the invention has the advantage of being of simple construction, readily calibrated, and easy to operate. The apparatus is suitable for indicating the bulk hardness of granular material in which pellets of different sizes are measured at the same time in a random sample of the material.

While there has been described to what is at present believed to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letter Patent is:

1. Apparatus for indicating the hardness of granular material comprising:
   means for crushing a sample of a plurality of granules of the material during a single predetermined displacement of said crushing means, the sample resisting crushing with a force determined by the hardness of the material;
   means for developing a first control effect representative of the instantaneous value of said force during the displacement of said crushing means;
   and means for integrating said first control effect with respect to a variable related to said displacement of said crushing means to develop a second control effect representative of the integrated value of said first control effect over said displacement and thus representative of the hardness of the material.

2. Apparatus in accordance with claim 1 in which said crushing means comprises a press having a movable platen and having a support subject to distortion determined by said force and having a stationaray platen mounted on said support.

3. Apparatus for indicating the hardness of granular material comprising:
   means for crushing a sample of a plurality of granules of the material during a single predetermined displacement of said crushing means, the sample resisting crushing with a force determined by the hardness of the material, said crushing means comprising a press having a movable platen and having an eccentric drive for said movable platen for moving said movable platen through said displacement, said press also having a support subject to distortion determined by said force and having a stationary platen mounted on said support;
   means for developing a first control effect representative of the instantaneous value of said force during said displacement of said crushing means;
   and means for integrating said first control effect with respect to a variable related to said displacement of said crushing means to develop a second control effect representative of the integrated value of said first control effect over said displacement and thus representative of the hardness of the material.

4. Apparatus in accordance with claim 2 in which said means for developing said first control effect comprises strain-gauge means mounted on said support.

5. Apparatus in accordance with claim 1 in which said means for developing a first control effect develops a first electrical signal as said first control effect and in which said means for integrating said first control effect develops a second electrical signal as said second control effect.

6. Apparatus in accordance with claim 1 in which said integrating means integrates said first control effect with respect to time to develop said second control effect as being representative of the integrated value of said first control effect over the time period of said displacement and thus representative of the hardness of the material.

References Cited

UNITED STATES PATENTS

| 2,637,202 | 5/1953 | Broschke | 73—81 |
| 3,116,632 | 1/1964 | Lane | 73—78 |
| 3,331,241 | 7/1967 | Boonstra et al. | 73—78 |

FOREIGN PATENTS 701,098  1/1965  Canada.

RICHARD C. QUEISSER, Primary Examiner
E. J. KOCH, Assistant Examiner